United States Patent [19]
Danna

[11] Patent Number: 5,479,738
[45] Date of Patent: Jan. 2, 1996

[54] WILDLIFE HUNTING AND OBSERVATION BLIND CONSTRUCTED FROM A SALVAGED LIQUID STORAGE TANK

[76] Inventor: Michael L. Danna, 12766 Conway Lake Ct., Creve Coeur, Mo. 63141

[21] Appl. No.: 164,217

[22] Filed: Dec. 9, 1993

[51] Int. Cl.⁶ ................................................. A01M 31/02
[52] U.S. Cl. ........................ 43/1; 135/901; 52/169.6
[58] Field of Search ......................... 43/1; 135/901, 135/900; 52/169.6, 79.1

[56] References Cited

U.S. PATENT DOCUMENTS

| | | | |
|---|---|---|---|
| 288,354 | 11/1883 | Mileham | 52/169.6 |
| 395,189 | 12/1888 | Stanton . | |
| 586,145 | 7/1897 | Sievers, Jr. . | |
| 2,871,802 | 2/1959 | Fishler | 52/169.6 |
| 3,159,117 | 12/1964 | Rosenfeld | 52/169.6 |
| 3,513,605 | 5/1970 | Smith | 135/901 |
| 4,067,347 | 1/1978 | Lipinski . | |
| 4,719,716 | 1/1988 | Chrisley, Jr. . | |
| 4,738,045 | 4/1988 | Cardozo . | |
| 4,794,717 | 1/1989 | Horsmann . | |
| 5,339,852 | 8/1994 | Bull | 43/1 |

FOREIGN PATENT DOCUMENTS

| | | | |
|---|---|---|---|
| 626583 | 11/1981 | Switzerland | 52/169.6 |
| 2081766A | 2/1982 | United Kingdom | 52/169.6 |

*Primary Examiner*—Kurt Rowan
*Assistant Examiner*—Chuck Y. Mah
*Attorney, Agent, or Firm*—Rogers, Howell & Haferkamp

[57] ABSTRACT

A blind used in hunting and observing wildlife and its method of construction employ a liquid storage tank of sufficient size to be occupied by one or more individuals in its interior, where the tank is modified with access openings and furbished with seating and storage enclosures.

20 Claims, 3 Drawing Sheets

WILDLIFE HUNTING AND OBSERVATION BLIND CONSTRUCTED FROM A SALVAGED LIQUID STORAGE TANK

BACKGROUND OF THE INVENTION (1) Field of the Invention

The present invention pertains to a blind used in hunting and observing wildlife and its method of construction.

(1') Description of the Related Art

Hunting, photographing and generally observing wildlife in their natural environment have long been popular pastimes. Individuals often practice these pastimes from blinds constructed in the natural habitat of wildlife to conceal the individuals from the wildlife and to prevent the wildlife from being frightened away from an area of their habitat by the presence of the individuals.

Various types of blinds are known in the prior art ranging from inexpensive, makeshift blinds constructed from the foliage available in the habitat area, to more expensive structures such as transportable blinds that are transported to the wildlife habitat area or permanent structures specifically designed and constructed to accomodate and conceal one or more individuals in the wildlife habitat area. Examples of prior art transportable blinds are disclosed in the U.S. Pat. Nos. of Chrisley, Jr. No. 4,719,716 and Horsmann No. 4,794,717; an example of a permanent blind structure is disclosed in the U.S. Pat. of Cardozo No. 4,738,045.

SUMMARY OF THE INVENTION

The present invention provides an inexpensively constructed blind that is dimensioned to accommodate several individuals comfortably and is constructed from an unused or salvaged liquid storage tank that is transportable as a completed blind to a desired area of wildlife habitat. The construction of the blind from a liquid storage tank enables the blind to be recessed into the ground, and thereby partially concealed, while preventing seepage of ground water into the blind interior. Access to the blind interior is provided through one or more openings cut through the side wall of the tank, where the openings are also employed in hunting, photographing or generally observing wildlife from the tank interior.

The tank interior is furnished with a floor, bench seating and cabinet enclosures providing comfortable accommodations for the occupant(s) of the blind. The exterior of the tank that appears above ground is provided with doors for each of the openings that may be locked in their closed positions preventing access to the tank interior, or pivoted to an open position or removed from the tank entirely to provide access by individuals to the tank interior through the openings.

In the preferred embodiment, the blind of the present invention is constructed according to the method of the invention from a salvaged fuel storage tank of the type removed from underground at closed gasoline service stations in compliance with environmental protection regulations.

BRIEF DESCRIPTION OF THE DRAWINGS

Further objects and features of the present invention are revealed in the following detailed description of the preferred embodiment of the invention and in the drawing figures wherein.

DESCRIPTION OF THE PREFERRED EMBODIMENT

Figure 1:
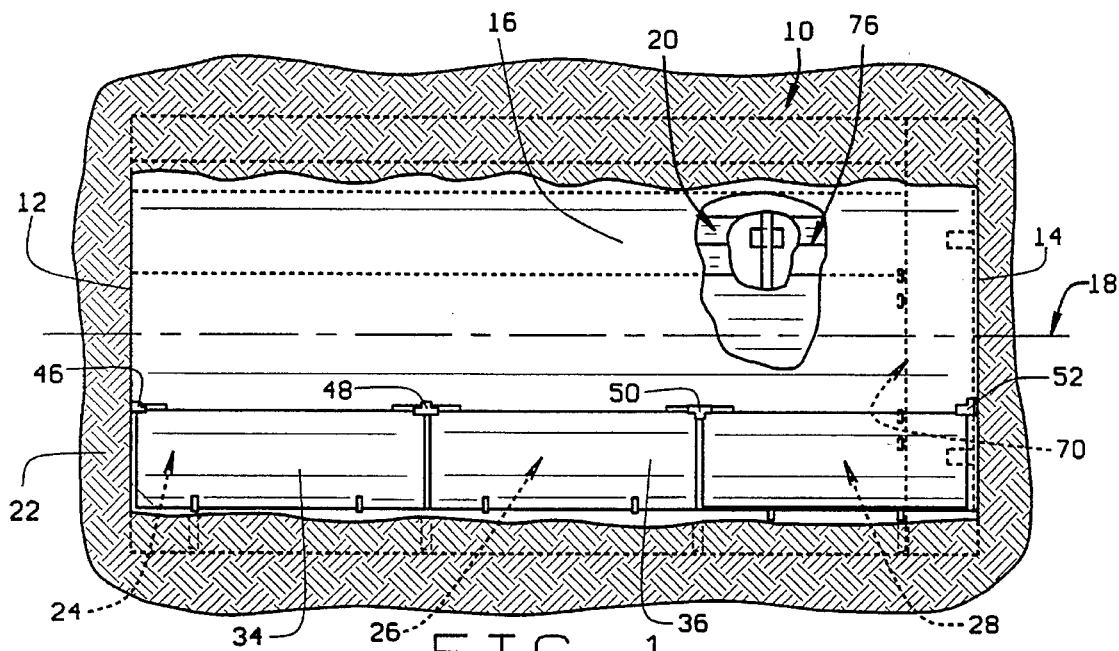
FIG. 1 is a top plan view of the blind of the present invention.

The blind 10 of the present invention is primarily constructed according to the method of the invention from a storage tank principally designed to store liquids. In the preferred embodiment, the storage tank is a metal tank. However, storage tanks constructed of plastics and other similar fluid tight materials may be employed in constructing the blind of the invention. In the preferred embodiment of the invention, the storage tank employed is a salvaged fuel storage tank of the type that is usually employed in storing gasoline underground at gasoline service stations. The blind 10 of the present invention provides a use for salvaged gasoline storage tanks that are removed from closed or refurbished gasoline service stations in accordance with environmental protection requirements. By constructing the blind 10 from a salvaged tank, the costs of manufacturing the blind are reduced. Moreover, the blind of the present invention provides a recycled use for the salvaged storage tank. Although in the preferred embodiment of the invention the blind is constructed from a salvaged tank, it is not intended that the invention be limited to its construction from a salvaged tank, but the scope of protection provided by the appended claims is intended to also include liquid storage tanks that have not been previously used.

As seen in the drawing figures, the blind 10 of the invention, in its preferred embodiment being constructed from a salvaged fuel storage tank, has the general cylindrical configuration typical of such tanks. The blind is generally comprised of a pair of longitudinally spaced end walls 12, 14. The end walls are substantially identical to each other and have circular peripheral edges. A side wall 16 of the tank is formed in a cylindrical configuration and extends completely around a center longitudinal axis 18 of the tank. Opposite longitudinal edges of the side wall 16 are secured to the peripheral edges of the pair of end walls 12, 14 by welding, thereby enclosing an interior 20 of the tank in a sealed enclosure.

A conventional fuel storage tank is usually provided with apertures in the tank walls for connections to conduits supplying gasoline or other fuels to the tank interior, or pumping the fuel from the tank interior. These apertures of the existing salvaged storage tank are not needed in the construction of the blind of the present invention and will be sealed closed by welding metal plates in these metal apertures or by other equivalent methods. Because these existing apertures are not material to the construction of the blind of the present invention they are not disclosed in the drawing figures or described further herein.

The conventional construction of the storage tank described above provides the blind 10 of the present invention with a rigid, self supporting shell housing structure around the tank interior 20. This existing tank construction is the primary component employed in constructing the blind 10 of the present invention with only minimum modifications to the existing tank construction. These modifications involve providing one or more openings through the tank side wall 16 and the addition of doors to the tank exterior for each of the openings.

Figure 2:
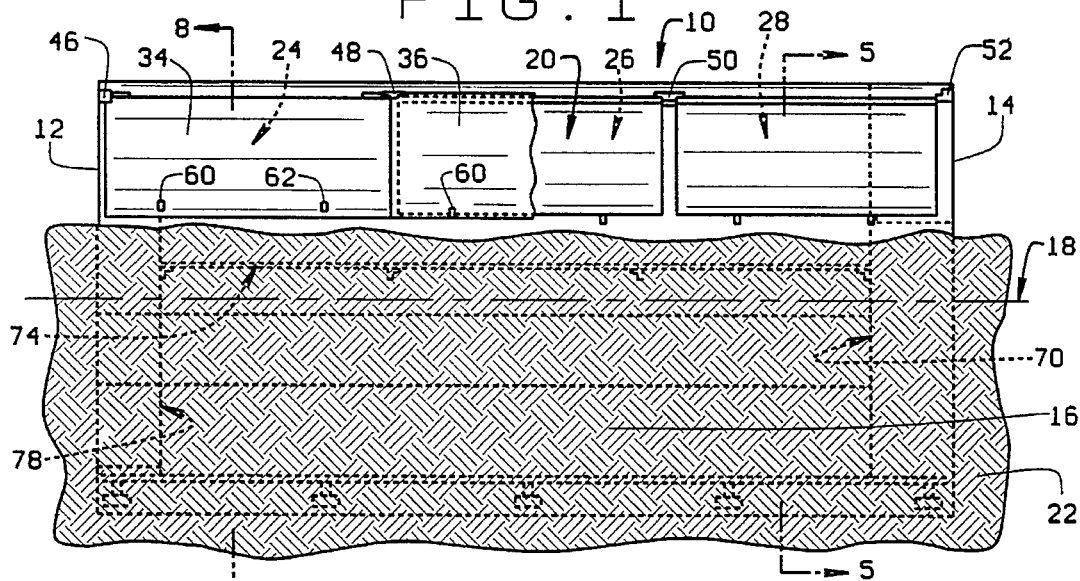
FIG. 2 is a side elevation view of the blind of FIG. 1.
Figure 5:
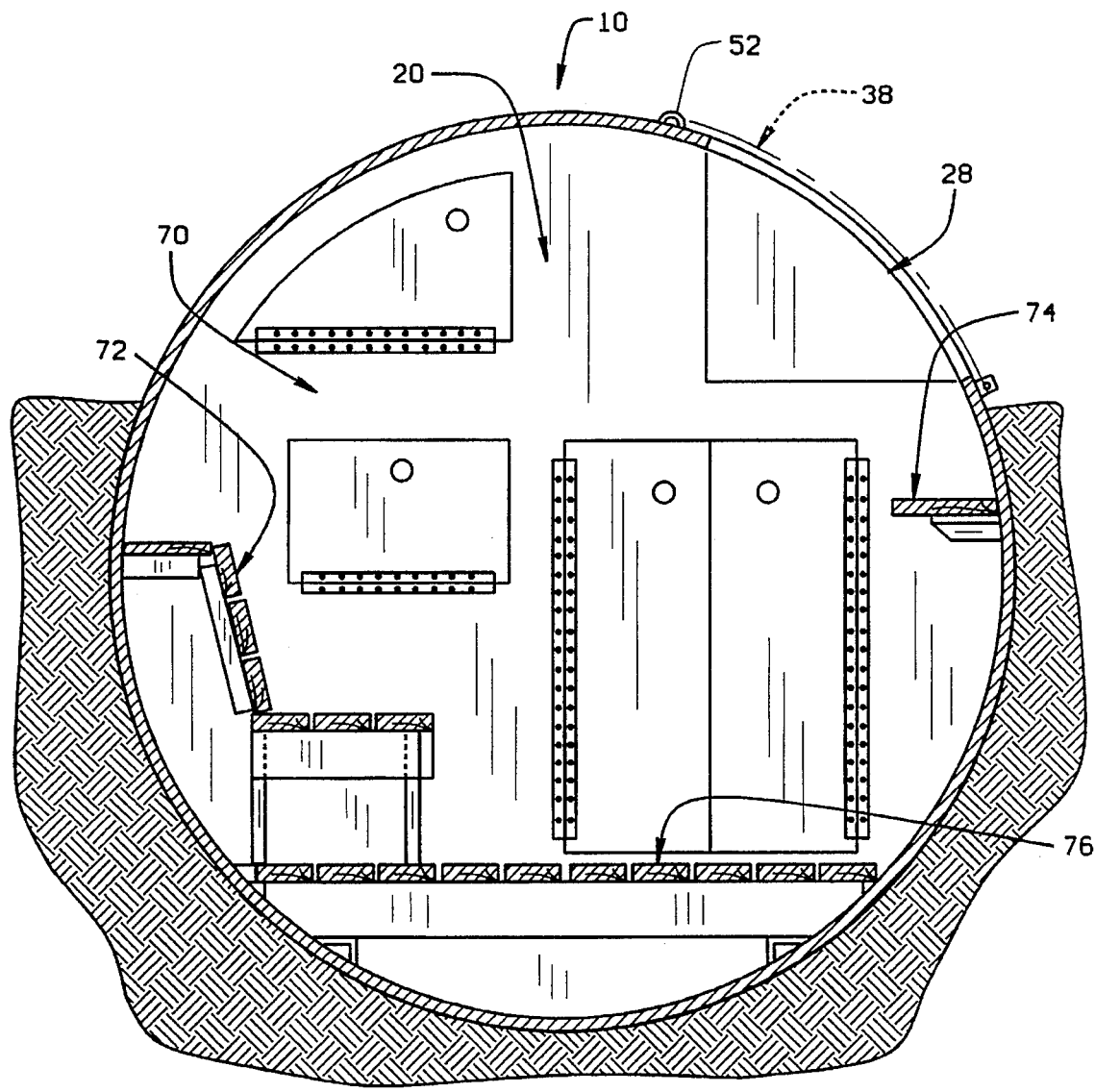
FIG. 5 is a cross section view of the blind of FIG. 2 taken along the line 5—5 of FIG. 2.
Figure 6:
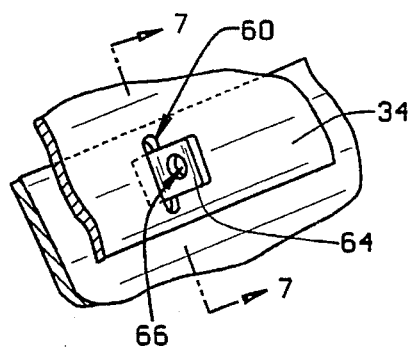
FIG. 6 is a detailed illustration of the assembly employed in locking the doors of the blind in their closed positions.
Figure 7:
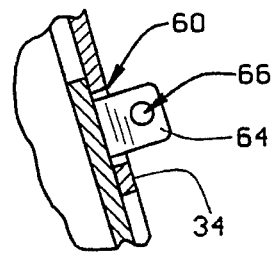
FIG. 7 is a cross section view of the assembly of FIG. 6 taken along the line 7—7 of FIG. 6.
Figure 8:
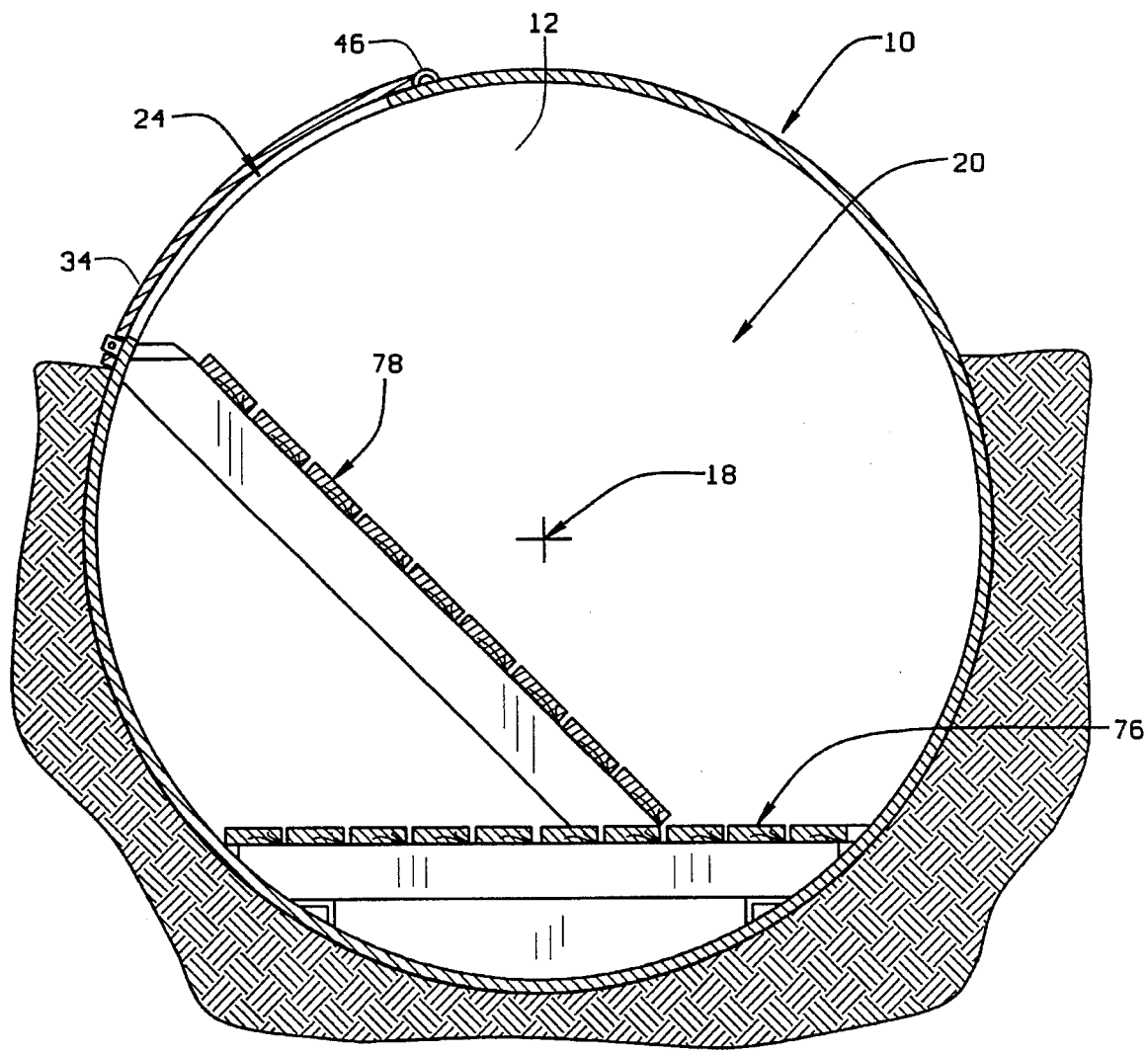
FIG. 8 is a cross section view of the blind of FIG. 2 taken along the line 8—8 of FIG. 2.

As shown in the drawing figures, in constructing the blind 10 of the present invention from the storage tank, the tank is oriented with its longitudinal center axis 18 extending substantially horizontally. In this position the tank wall is generally symmetric on opposite sides of a horizontal plane bisecting the tank along the center axis. The lower portion of the tank below the center axis 18 is unchanged, thereby providing a fluid tight portion of the blind enclosure that may be recessed below ground 22 as shown in FIGS. 1 and 2 to partially conceal the blind 10 and prevent the seepage of ground water into the blind interior 20. The portion of the tank above the center axis 18 is divided into a forward quadrant, shown to the right in FIG. 5 and to the left in FIG. 8, and a rearward quadrant shown to the left in FIG. 5 and to the right in FIG. 8. The rearward quadrant of the tank upper portion is also unmodified in constructing the blind 10 of the present invention. The forward quadrant is modified by cutting one or more access openings through the side wall 16 (with three openings 24, 26, 28 being shown in the preferred embodiment). Each of the openings 24, 26, 28 are dimensioned sufficiently large to enable an individual to enter and leave from the tank interior 20 through any one of the access openings. As best seen in FIGS. 5 and 8, the side wall 16 of the blind 10 extends continuously from the bottom edges of each of the three access openings 24, 26, 28 completely around the center axis 18 of the blind to the top edges of the access openings, thereby providing protection to individuals occupying the blind 10 from the exterior environment.

Three doors 34, 36, 38 having vertical cross sections with curvatures that match that of the blind side wall 16 are mounted to the exterior of the side wall just above the three access openings 24, 26, 28. One door 38 of the three has been removed from the blind 10 as shown in FIGS. 1 and 2, but is shown in dashed lines on the blind closed over its access opening 28 in FIG. 5. The construction of each of the doors is substantially identical, and the construction of only one of the three doors will be described herein. A notch 40 is formed in the longitudinally opposite ends of the top edge 42 of each door. Pivot pins 44 are welded to the opposite longitudinal ends of the door top edge where distal ends of the pins extend over portions of the notches 40.

Figure 3:
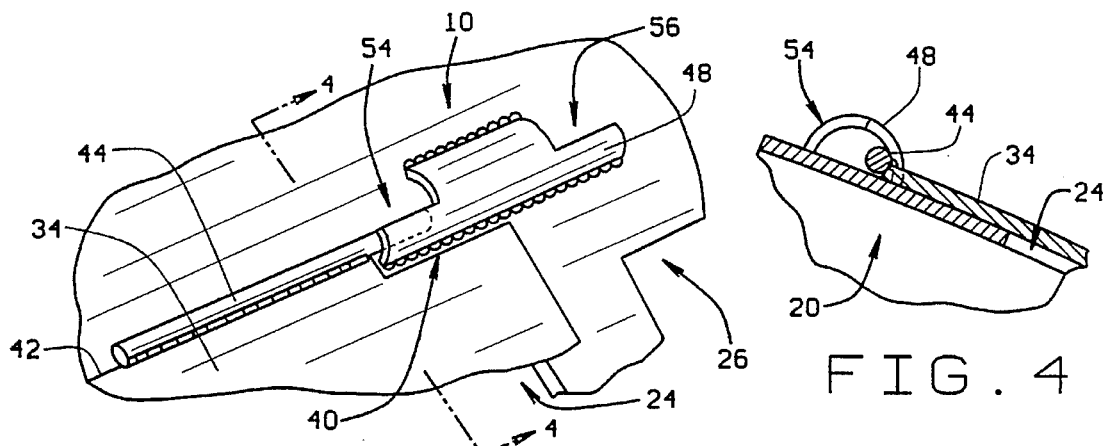
FIG. 3 is a detailed illustration of the preferred embodiment of the releasable door hinge of the present invention.
Figure 4:
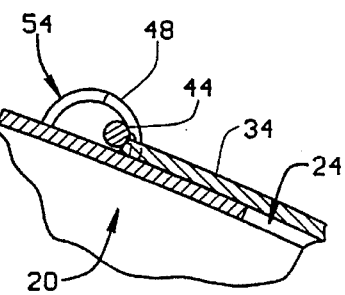
FIG. 4 is a cross section view of the hinge of FIG. 3 taken along the line 4—4 of FIG. 3.

Four semicircular hinge members 46, 48, 50, 52 are secured to the exterior of the blind side wall 16 above the three access openings in the positions shown in FIGS. 1 and 2. The construction of the two middle hinge members 48, 50 is shown in FIGS. 3 and 4. As seen in these drawing figures, the middle two hinge members have a generally semicircular cross section with longitudinally spaced gaps 54, 56 cut through the upper halves of the hinge members. The gaps are provided to receive a pivot pin 44 of the doors when mounting the doors to the exterior of the blind side wall 16 for pivoting movement of the doors relative to the side wall. The constructions of the hinge members with the gaps 54, 56 enable the doors to be pivoted upward from their closed positions over the access openings to at rest positions where the doors rest on top of the side wall exterior surface. The gaps 54, 56 enable the doors to be easily removed from their pivoting connection to the blind side wall by lifting the pivot pins 44 upward through the gaps. The configuration of the middle pair of hinge members 48, 50 shown in FIG. 3 is to accommodate a pivot pin 44 of both the center door 36 and the longitudinally spaced pair of doors 34, 38 at opposite ends of each hinge member. It should be understood that the hinge members 46, 52 that support the outside pivot pins 44 of the longitudinally spaced doors 34, 38 require only one gap for the single pivot pin and have the configuration of only one half of the center hinge members 48, 50.

Each of the three doors 34, 36, 38 are provided with a pair of slots 60, 62 adjacent their bottom edge. Projecting tabs or staples 64 are welded to the exterior surface of the blind side wall 16 adjacent the bottom edges of the access openings and positioned to project through the pair of slots 60, 62 of each door with the door pivoted to its closed position. The tabs 64 have holes 66 therethrough to permit a padlock to be inserted through the hole to prevent the door from passing upward over the tab, thereby locking the door in its closed position over the access opening. With each door in its closed position with a pair of tabs inserted through the door slots and padlocks on the tabs, the door cannot be pivoted open or lifted to disengage the door's pivot pins from the hinge members.

In the preferred embodiment of the invention, the storage tank from which the blind 10 is constructed has ample interior space to permit an individual to stand upright in the tank interior. Fuel storage tanks of the type from which the blind 10 of the invention is constructed typically have an eight foot outside diameter and a sixteen foot longitudinal length. These dimensions provide ample room in the interior 20 of the tank for adding accommodations to the interior making its occupancy more comfortable. Examples of some of the accommodations possible are illustrated in the drawing figures. These accommodations include cabinet or other storage enclosures 70 constructed against one of the tank end walls 41, a bench seat 72 that extends along the longitudinal length of the tank interior, a shelf 74 or gun rack that extends longitudinally along the tank interior just below the access openings, and floor decking 76 providing a level floor surface to the tank interior. The accommodations also include a ramp 78 that extends downward from the access openings adjacent the left blind end wall 12. The ramp is provided to facilitate entering and exiting the blind interior 20 through the access opening 24, for use by individuals occupying the blind and by hunting dogs where the blind is primarily used for hunting. The accommodations shown in the drawing figures are exemplary of the various modifications that may be incorporated into the blind interior 20. Various other accommodations such as cooking and heating facilities or electric lighting may also be provided.

In variant embodiments of the blind described above, an access opening could be cut through one of the end walls 12, 14 and a ramp constructed outside the blind leading from the ground surface down to the access opening to provide wheelchair access to the blind. Also, an access opening could be cut through the top of the blind and a wheelchair elevator platform installed in the blind below the top access opening to provide wheelchair access to the blind.

Although the present invention has been described with reference to specific embodiments, it should be understood that modifications and variations of the invention may be constructed without departing from the scope of the invention defined in the following claims.

What is claimed is:

1. A method of constructing a blind used in observing wildlife, the method comprising the steps of:

providing a rigid, self supporting storage tank having a tank wall that encloses a tank interior, the tank wall including a forward half and a rearward half, the tank interior being sufficiently large to enable an individual to stand upright in the tank interior; and cutting at least one opening through the tank wall forward half, the opening being positioned entirely within the tank wall forward half and dimensioned sufficiently large to enable an individual to pass through the opening on entering the tank interior.

2. The method of claim 1, further comprising the step of:

attaching a door to the tank adjacent the opening for pivoting movement of the door relative to the tank between a first position where the door covers over the opening and a second position where the door is displaced from the opening.

3. The method of claim 1, wherein:

the storage tank is a salvaged liquid storage tank.

4. The method of claim 1 wherein the tank wall is a tubular wall having a top half and a bottom half, the top half including a forward quadrant and a rearward quadrant, the step of cutting the opening including:

cutting the opening in the forward quadrant of the tubular wall.

5. The method of claim 4, further comprising the step of:

partially burying the storage tank with the bottom half of the tubular wall underground and at least a portion of the top half of the tubular wall projecting aboveground.

6. The method of claim 4, wherein:

the tubular wall is a generally cylindrical wall.

7. A blind for observing wildlife, the blind comprising:

a tubular wall extending around a horizontal center axis of the tubular wall, the tubular wall having an upper half, a bottom half, opposite edges, and at least one opening in the upper half; and a pair of axially spaced sidewalls connected to the opposite edges of the tubular wall, the tubular wall and the pair of sidewalls together defining an interior volume of the blind, the interior volume being sufficiently large enabling an individual to stand upright within the interior volume, the opening in the upper half of the tubular wall providing access to the interior volume from outside the blind, the bottom half of the tubular wall being buried underground, the opening in the upper half of the tubular wall having a lower edge, the lower edge of the opening being sufficiently proximate to a ground surface enabling an individual to step from the ground surface through the opening and into the interior volume of the blind, and at least a portion of the upper half of the tubular wall projecting aboveground.

8. The blind of claim 7, wherein:

the tubular wall is a generally cylindrical wall.

9. The blind of claim 7, wherein:

the upper half of the tubular wall includes a forward quadrant and a rearward quadrant, the opening has a top edge and is positioned entirely in the forward quadrant, the tubular wall has no opening in the forward quadrant positioned above the top edge and no opening in the rearward quadrant.

10. The blind of claim 9, wherein:

the tubular wall has no openings in the pair of sidewalls.

11. The blind of claim 7, further comprising:

a hinged door over the opening in the upper half of the tubular wall.

12. The blind of claim 11, wherein:

the door is removably hinged.

13. The blind of claim 11, further comprising:

means for locking the door over the opening in the upper half of the tubular wall.

14. A blind for observing wildlife, the blind comprising:

a tubular wall extending around a horizontal center axis of the tubular wall, the tubular wall having opposite edges, a bottom half, and an upper half, the upper half including a forward quadrant and a rearward quadrant with at least one opening in the forward quadrant; and a pair of axially spaced sidewalls connected to the opposite edges of the tubular wall, the tubular wall and the pair of sidewalls together defining an interior volume of the blind, the interior volume being sufficiently large enabling an individual to stand upright within the interior volume, the opening in the forward quadrant of the upper half providing access for an individual to enter the interior volume from outside the blind, the opening in the forward quadrant having a top edge, the tubular wall having no opening in the forward quadrant positioned above the top edge and no opening in the rearward quadrant, the tubular wall extending through the rearward quadrant of the upper half into at least a portion of the forward quadrant of the upper half and up to the top edge of the opening in the forward quadrant, thereby providing an overhang in the forward quadrant of the upper half for sheltering occupants of the interior volume of the blind.

15. The blind of claim 14, wherein:

the tubular wall is a generally cylindrical wall.

16. The blind of claim 14, wherein:

the bottom half of the tubular wall is buried underground and at least a portion of the upper half of the tubular wall projects aboveground.

17. The blind of claim 16, wherein:

the opening in the upper half of the tubular wall has a lower edge, and the lower edge of the opening is sufficiently proximate to a ground surface, enabling an individual to step from the ground surface through the opening and into the interior volume of the blind.

18. The blind of claim 16, wherein:

portions of the pair of sidewalls and tubular wall positioned below the horizontal center axis of the tubular wall are fluid tight, thereby preventing ground water from entering the blind through the pair of sidewalls and tubular wall.

19. The blind of claim 14, wherein:

the tubular wall has no openings in the pair of sidewalls.

20. The blind of claim 14, wherein:

a door is attached to the tubular wall adjacent the opening in the forward quadrant of the upper half for pivoting movement of the door relative to the tubular wall between a first position where the door covers over the opening and a second position where the door is displaced away from the opening.

* * * * *